(12) United States Patent
Matalon

(10) Patent No.: US 11,668,403 B2
(45) Date of Patent: Jun. 6, 2023

(54) TRANSITION PRESSURE RING

(71) Applicant: ITT MANUFACTURING ENTERPRISES LLC, Wilmington, DE (US)

(72) Inventor: Louis E. Matalon, Lancaster, PA (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 0 days.

(21) Appl. No.: 17/431,892

(22) PCT Filed: Feb. 20, 2019

(86) PCT No.: PCT/US2019/018739
§ 371 (c)(1),
(2) Date: Aug. 18, 2021

(87) PCT Pub. No.: WO2020/171808
PCT Pub. Date: Aug. 27, 2020

(65) Prior Publication Data
US 2022/0128159 A1  Apr. 28, 2022

(51) Int. Cl.
*F16K 7/12* (2006.01)
*F16K 27/02* (2006.01)
*F16K 31/60* (2006.01)

(52) U.S. Cl.
CPC .......... *F16K 7/126* (2013.01); *F16K 27/0236* (2013.01); *F16K 31/60* (2013.01)

(58) Field of Classification Search
CPC ........ F16K 7/12; F16K 7/126; F16K 27/0236; F16K 31/50; F16K 31/60
See application file for complete search history.

(56) References Cited

U.S. PATENT DOCUMENTS

| 4,671,490 A | 6/1987 | Kolenc et al. |
| 4,750,709 A * | 6/1988 | Kolenc ................... F16K 41/12 137/556 |

(Continued)

FOREIGN PATENT DOCUMENTS

| CN | 1666053 A | 9/2005 |
| CN | 103511658 A | 1/2014 |

(Continued)

OTHER PUBLICATIONS

International Search Report dated Aug. 2, 2019 for corresponding International PCT Application No. PCT/US2019/018739.

(Continued)

*Primary Examiner* — Hailey K. Do
(74) *Attorney, Agent, or Firm* — Carter, DeLuca & Farrell LLP; George Likourezos; Bret P. Shapiro

(57) ABSTRACT

Technologies are described for devices and methods to seal a diaphragm to a body exterior seal periphery. The methods may comprise rotating a handwheel of a bonnet assembly to move a load plate to apply a compression force to a top portion of a transition pressure ring. The top portion of the transition pressure ring may have a circular cross section. A bottom portion of the transition pressure ring may include a bead that may project out from a bottom surface of the bottom portion and may have a congruent shape and size as the body exterior seal periphery. The body exterior seal periphery may not be congruent to the circular cross section of the top portion. The compression force may press the bead against a diaphragm assembly and the diaphragm against the body exterior seal periphery, to seal the diaphragm to the body exterior seal periphery.

14 Claims, 4 Drawing Sheets

(56) References Cited

U.S. PATENT DOCUMENTS

| | | | |
|---|---|---|---|
| 9,016,307 B2* | 4/2015 | Matalon | F16K 7/126 251/248 |
| 10,323,766 B2* | 6/2019 | Vu | F16K 7/12 |
| 2006/0118751 A1 | 6/2006 | Lodolo | |
| 2014/0021391 A1 | 1/2014 | Matalon et al. | |
| 2015/0129791 A1 | 5/2015 | Okita et al. | |
| 2015/0354718 A1 | 12/2015 | Schwetz et al. | |

FOREIGN PATENT DOCUMENTS

| | | | | |
|---|---|---|---|---|
| CN | 206001041 U | | 3/2017 | |
| DE | 102015202775 A1 | | 8/2016 | |
| EP | 2875266 A1 | | 5/2015 | |
| EP | 3246605 A1 | * | 11/2017 | F16K 27/0236 |
| EP | 3333465 A1 | | 6/2018 | |

OTHER PUBLICATIONS

Chinese Office Action in corresponding Chinese Application No. 201980092620.3, dated Mar. 24, 2023.

\* cited by examiner

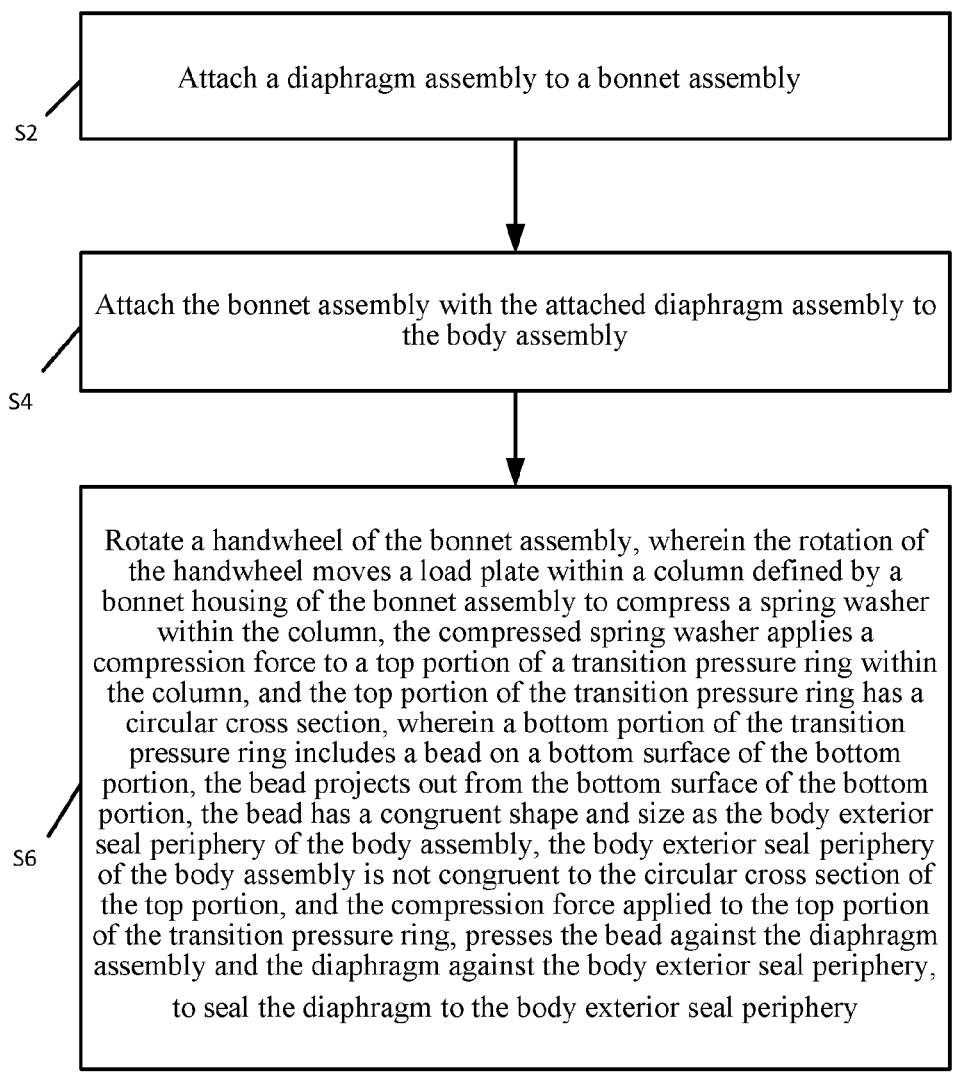

TRANSITION PRESSURE RING

This application claims priority to International Application No. PCT/US2019/018739 filed on Feb. 20, 2019 and is related to application Ser. No. PCT/US2019/18734 entitled Diaphragm Assembly, and application Ser. No. PCT/US2019/18736 entitled Keying Structure.

BACKGROUND

Unless otherwise indicated herein, the materials described in this section are not prior art to the claims in this application and are not admitted to be prior art by inclusion in this section.

Diaphragm valves may be comprised of three major subassemblies, a bonnet assembly, a body assembly, and a diaphragm assembly. The bonnet assembly and the body assembly may be held together with a series of bolts around the periphery of the assemblies. The diaphragm assembly may be positioned in between the bonnet assembly and the body assembly. The bonnet assembly may apply pressure to the diaphragm assembly to seal the diaphragm assembly to the body assembly. The bonnet assembly may also control the diaphragm assembly to open and close the diaphragm valve against a weir of the body assembly.

SUMMARY

One embodiment of the invention is a bonnet assembly. The bonnet assembly may comprise a handwheel. The bonnet assembly may comprise a bonnet housing. The bonnet housing may define a cylindrical column. The bonnet assembly may comprise a load plate within the cylindrical column. The bonnet assembly may comprise a spring washer within the cylindrical column. A first side of the spring washer may be in contact with the load plate. The bonnet assembly may comprise a transition pressure ring. The transition pressure ring may include a top portion and a bottom portion. The top portion may have a circular cross section and may be in contact with a second side of the spring washer. The bottom portion may include a bead on a bottom surface of the bottom portion. The bead may project out from the bottom surface of the bottom portion. The bead may have a congruent shape and size as a body exterior seal periphery of a body assembly. The body exterior seal periphery of the body assembly may not be congruent to the circular cross section of the top portion.

Another embodiment of the invention includes a method to seal a diaphragm to a body exterior seal periphery of a body assembly. The methods may comprise attaching a diaphragm assembly to a bonnet assembly. The methods may comprise attaching the bonnet assembly with the attached diaphragm assembly to the body assembly. The methods may comprise rotating a handwheel of the bonnet assembly. The rotation of the handwheel may move a load plate within a column defined by a bonnet housing of the bonnet assembly to compress a spring washer within the column. The compressed spring washer may apply a compression force to a top portion of a transition pressure ring within the column. The top portion of the transition pressure ring may have a circular cross section. A bottom portion of the transition pressure ring may include a bead on a bottom surface of the bottom portion. The bead may project out from the bottom surface of the bottom portion. The bead may have a congruent shape and size as the body exterior seal periphery of the body assembly. The body exterior seal periphery of the body assembly may not be congruent to the circular cross section of the top portion. The compression force applied to the top portion of the transition pressure ring may press the bead against the diaphragm assembly and the diaphragm against the body exterior seal periphery, to seal the diaphragm to the body exterior seal periphery.

Another embodiment of the invention is a valve. The valve may comprise a bonnet assembly. The bonnet assembly may include a handwheel. The bonnet assembly may include a bonnet housing. The bonnet housing may define a cylindrical column. The bonnet assembly may include a load plate within the cylindrical column. The bonnet assembly may include a spring washer within the cylindrical column. A first side of the spring washer may be in contact with the load plate. The bonnet assembly may include a transition pressure ring. The valve may comprise a diaphragm assembly. The valve may comprise a body assembly. The body assembly may include a weir. The transition pressure ring may include a top portion and a bottom portion. The top portion may have a circular cross section and may be in contact with a second side of the spring washer. The bottom portion may include a bead on a bottom surface of the bottom portion. The bead may project out from the bottom surface of the bottom portion. The bead may have a congruent shape and size as a body exterior seal periphery of a body assembly. The body exterior seal periphery of the body assembly may not be congruent to the circular cross section of the top portion.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 illustrates a flow diagram for an example process to seal a diaphragm to a body exterior seal periphery of a body assembly, all arranged according to at least some embodiments described herein.

DETAILED DESCRIPTION

Figure 1:
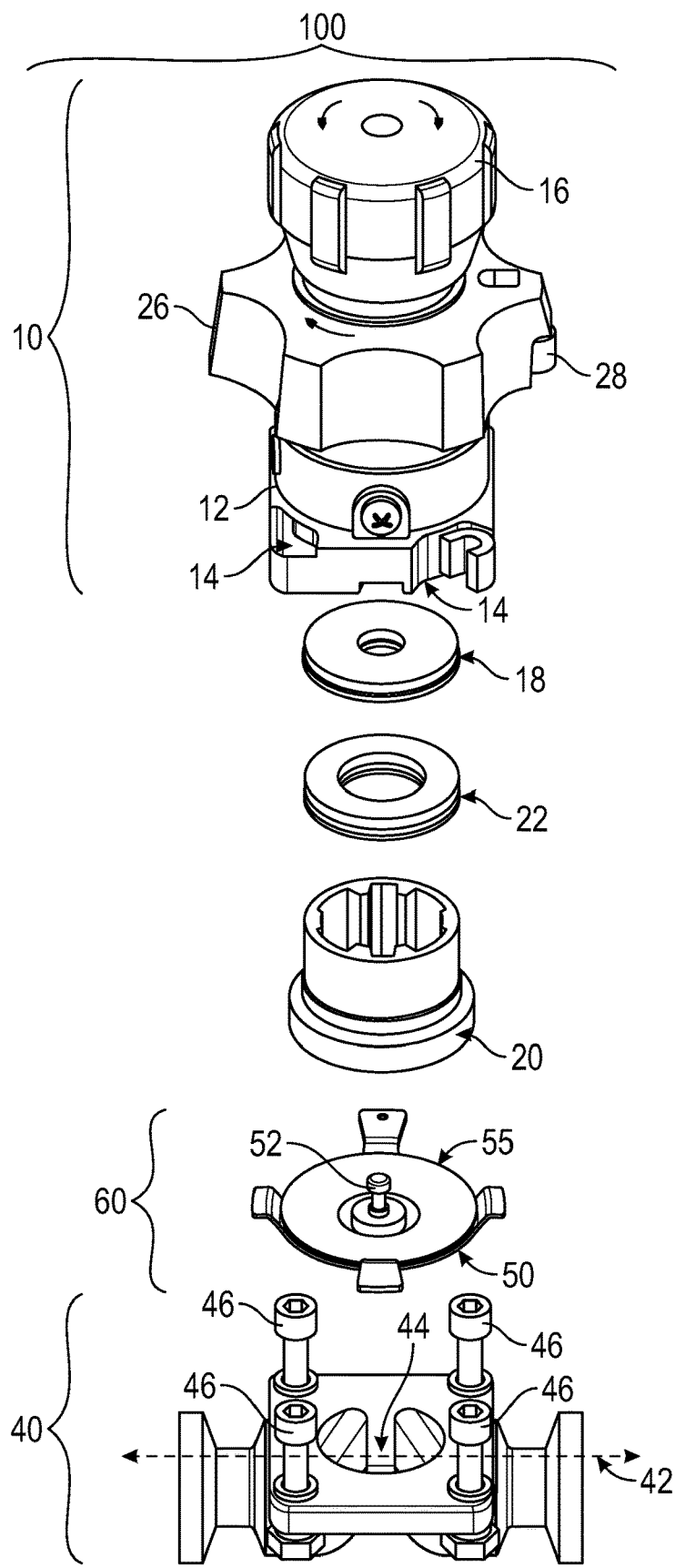
FIG. 1 is an exploded top perspective view of a diaphragm valve including a bonnet assembly, a diaphragm assembly, and a body assembly.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 is an exploded top perspective view of a diaphragm valve including a bonnet assembly, a diaphragm assembly, and a body assembly, arranged in accordance with at least some embodiments described herein. Diaphragm valve 100 may include a bonnet assembly 10, a diaphragm assembly 60, and a body assembly 40. Bonnet assembly 10 may include a housing 12, a handwheel 16, a safety lock handwheel 26, a safety lock 28, a load plate 18, spring washers 22, and a transition pressure ring 20. Housing 12 may define keyholes 14.

Diaphragm assembly 60 may include a diaphragm 50 and a backing cushion 55. Diaphragm 50 may include a diaphragm stud 52. Diaphragm stud 52 may be configured to threadedly couple with an open threaded aperture of bonnet assembly 10. Backing cushion 55 may have a disc shape. A material of backing cushion 55 may define a small aperture through the middle of backing cushion 55. Diaphragm stud 52 may thread through the small aperture defined by backing cushion 55 and into open threaded aperture of bonnet assembly 10. Backing cushion 55 may be sandwiched between diaphragm 50 and bonnet housing 12 when diaphragm 50 is attached to bonnet assembly 10.

Body assembly 40 may define a fluid passageway 42. Body assembly 40 may include a weir 44. Weir 44 may be positioned within fluid passageway 42 and may cooperate with diaphragm assembly 60 to control a flow of fluid through fluid passageway 42. Body assembly 40 may include body studs 46. Body assembly 40 may include body studs 46 on a first side of body assembly 40. One body stud 46 may be affixed at each of four top corners of body assembly 40. Body studs 46 may be configured in a square, rectangular, or offset pattern on top side of body assembly 40 when viewed from above. Body studs 46 may align with keyholes 14 defined by housing 12 of bonnet assembly 10. Keyholes 14 and bonnet assembly 10 may be positioned around body studs 46 and rotated around a primary axis of diaphragm valve 100 to attach bonnet assembly 10 to body 40. As described in more detail below, pressure ring 20 and bonnet assembly 10 may apply pressure to diaphragm assembly 60 to seal diaphragm 50 to body assembly 40 at a body exterior seal periphery.

Figure 2:
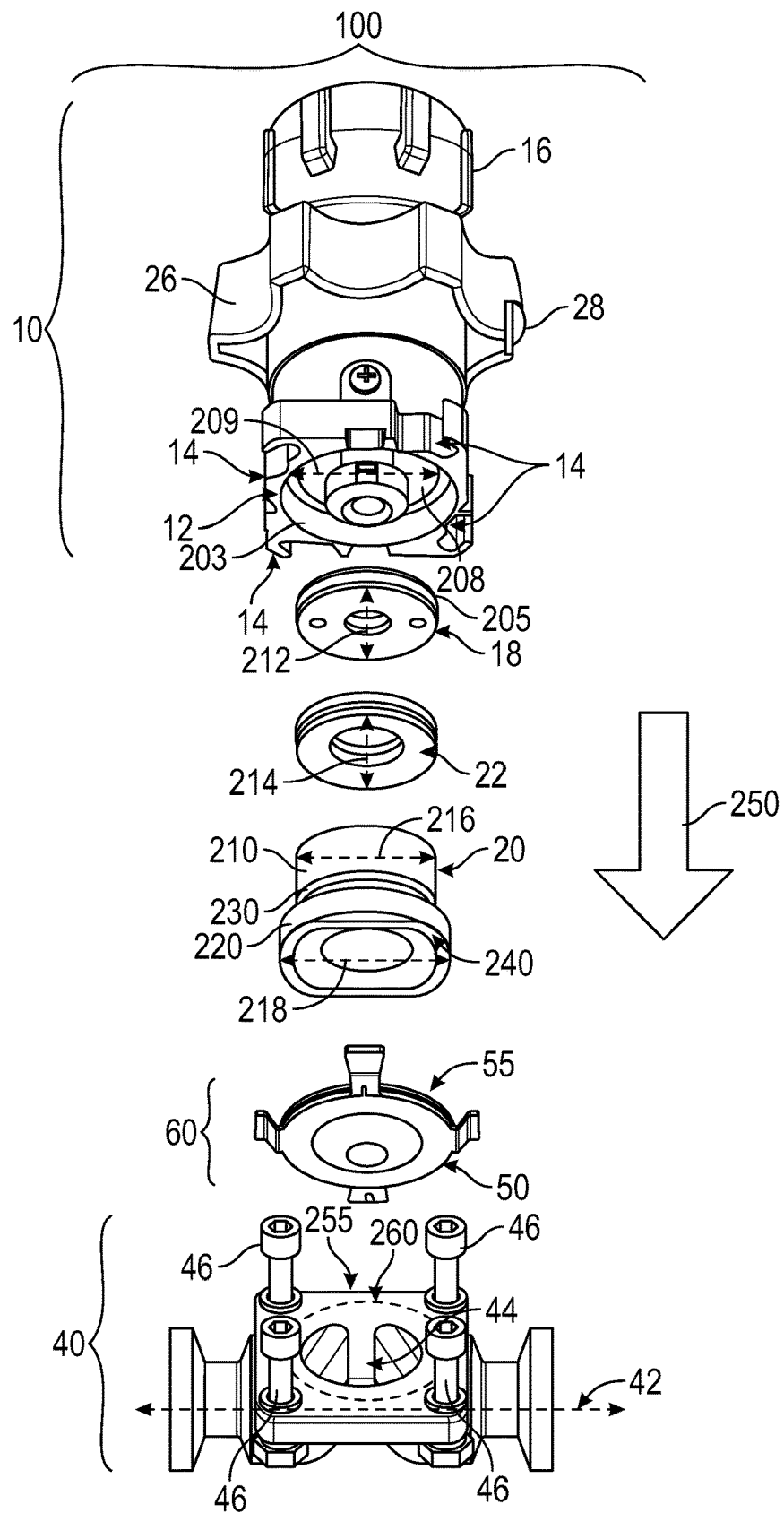
FIG. 2 is an exploded view of a diaphragm valve including a bottom perspective view of a bonnet assembly and a diaphragm assembly, and a top perspective view of a body assembly.

FIG. 2 is an exploded view of a diaphragm valve including a bottom perspective view of a bonnet assembly and a diaphragm assembly, and top perspective view of a body assembly, arranged in accordance with at least some embodiments described herein. Those components in FIG. 2 that are labeled identically to components of FIG. 1 will not be described again for the purposes of brevity.

Diaphragm valve 100 may include bonnet assembly 10, diaphragm assembly 60, and body assembly 40. Bonnet housing 12 may accommodate load plate 18, spring washers 22, and transition pressure ring 20. Walls of bonnet housing 12 may define a cylindrical column 208 with a diameter 209. Load plate 18, spring washers 22, and transition pressure ring 20 may comprise stainless steel. Load plate 18 may be disc or ring shaped with a circular cross section with a diameter 212, and may include an O-ring 205 on an outer edge. Diameter 212 may be similar in size to diameter 209 and a cross section of load plate 18 may fit within cylindrical column 208 defined by walls of housing 12 of bonnet assembly 10. O-ring 205 may form a seal between an outer edge of load plate 18 and walls of housing 12 that define column 208. Bonnet assembly 10 may utilize pins or screws to move load plate 18, in a downward direction along column 208, when safety lock handwheel 26 is rotated in a first direction. Bonnet assembly 10 may move load plate 18 in an upward direction when safety lock handwheel 26 is rotated in a second direction, opposite the first direction. Safety lock 28 may control a rotation of safety lock handwheel 26 and may allow rotation of safety lock handwheel 26 in the first direction and not in the second direction when safety lock 28 is not engaged. Safety lock 28 may control a rotation of safety lock handwheel 26 and may allow rotation of safety lock handwheel 26 in the second direction when safety lock 28 is engaged. Atop side of spring washers 22 may be in contact with a bottom side of load plate 18 within column 208.

Rotation of safety lock handwheel 26 may cause load plate 18 to move in a downward direction along column 208 and may compress one or more spring washers 22. Spring washers 22 may be conical spring washers, BELLEVILLE washers, disc springs, metallic springs, or any other washer with a cylindrical shape. Spring washers 22 may have a circular cross section with a diameter of 214. Diameter 214 may be similar to diameter 212 of load plate 18 and diameter 209 of cylindrical column 208 defined by walls of housing 12. Atop side of transition pressure ring 20 may be in contact with a bottom side of spring washers 22 within column 208. Spring washers 22 compressed by rotation of safety lock handwheel 26 may apply a compression force 250 to transition pressure ring 20.

Transition pressure ring 20 may include a top portion 210 and a bottom portion 220. Top portion 210 may include an O-ring 230. Top portion 210 may be in contact with the bottom side of spring washers 22. Top portion 210 may have a circular cross section with a diameter of 216. Diameter 216 may be similar to diameter 214 of spring washers 22, diameter 212 of load plate 18, and diameter 209 of cylindrical column 208 defined by walls of housing 12. A cross section of top portion 210 may fit within cylindrical column 208 defined by walls of housing 12 of bonnet assembly 10. O-ring 230 may form a seal between an outer edge of top portion 210 and walls of housing 12 defining cylindrical column 208. Bottom portion 220 may have a circular cross section and may have a diameter 218. Diameter 218 may be greater than diameter 216 of top portion 210. Bonnet housing 12 may define an opening 203 and bottom portion 220 may fit within opening 203 defined by bonnet housing 12. Bottom portion 220 may include a bead 240 on a bottom surface of bottom portion 220.

Body assembly 40 may include weir 44. Body assembly 40 may include a top surface 255. Top surface 255 of body assembly 40 may surround weir 44. A body exterior seal periphery 260 may be an area of top surface 255 which is proximate to weir 44 and forms a seal perimeter boundary around weir 44. Body exterior seal periphery 260 may not be congruent to a cross section of top portion 210. Body exterior seal periphery 260 may have a different shape or size from a cross section of top portion 210. As described in more detail below, bead 240 may align with body exterior seal periphery 260 and pressure ring 20 may apply pressure to diaphragm assembly 60 to seal diaphragm 50 to body assembly 40 at body exterior seal periphery 260.

Figure 3A:
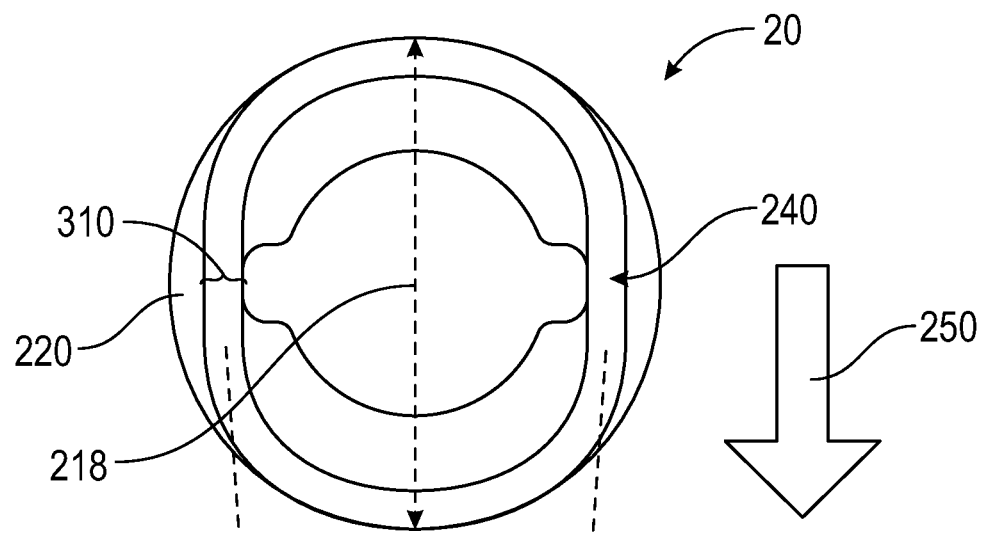
FIG. 3A is a bottom view of a transition pressure ring.
Figure 3B:
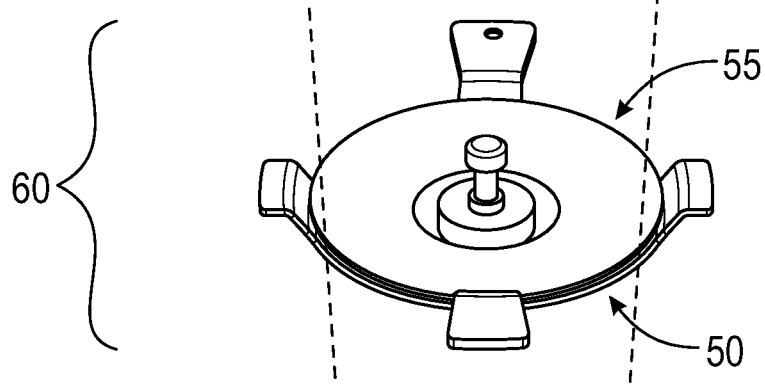
FIG. 3B is a side perspective view of a diaphragm assembly.
Figure 3C:
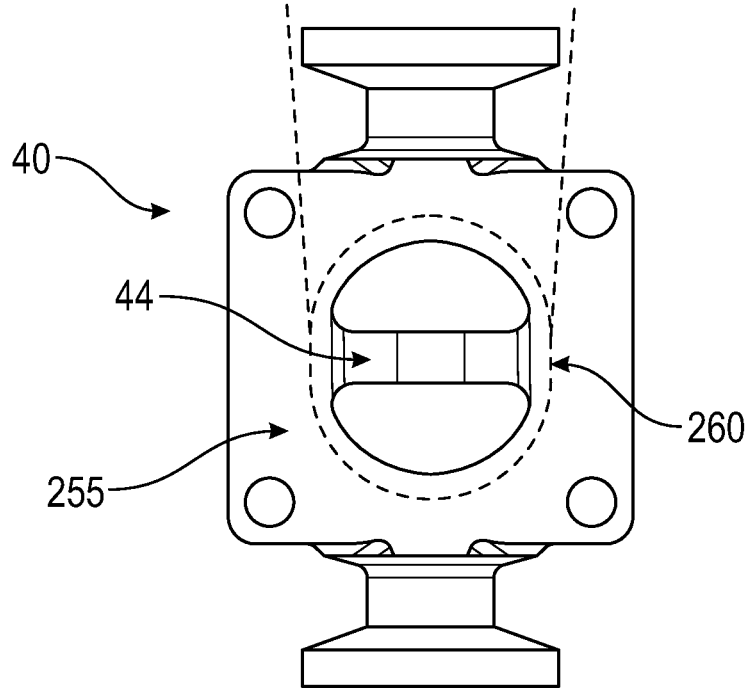
FIG. 3C is a top view of a body assembly.

FIG. 3A is a bottom prospective view of transition pressure ring 20, FIG. 3B is a side prospective view of diaphragm assembly 60, and FIG. 3C a top prospective view of body assembly 40, all arranged in accordance with at least some embodiments presented herein. Those components in FIGS. 3A-C that are labeled identically to components of FIGS. 1-2 will not be described again for the purposes of brevity.

As shown in FIGS. 3A-C, bead 240 may be on a bottom surface of bottom portion 220 of pressure ring 20. Bead 240 may have a circular, oval, racetrack, or any other shape. Bead 240 may include a flat plane and may project out at any height from bottom portion 220. In an example, bead 240 may project out at a height of 0.020 to 0.050 inches from the bottom surface of bottom portion 220. Bead 240 may have a width 310. Bead 240 width 310 may provide a sufficient sealing pressure between diaphragm 50 and body assembly 40 by width 310 determining a sealing area for a sealing pressure from pressure ring 20. In an example, width 310 may be 0.06 to 0.120 inches and may ensure a seal between the diaphragm 50 and the body assembly 40.

Body assembly 40 may include weir 44 and body exterior seal periphery 260. Body exterior seal periphery 260 may be an area of top surface 255 of body assembly 40 which forms a seal perimeter boundary around weir 44. Body exterior seal periphery 260 may have a circular, oval, racetrack, or any other shape. Bead 240 may have a congruent shape to body exterior seal periphery 260.

When bonnet assembly 10, with diaphragm assembly 60, is attached to body assembly 40, and diaphragm valve 100 is in operation, bead 240 may be in contact with backing cushion 55 of diaphragm assembly 60 and diaphragm 50 may be in contact with body exterior seal periphery 260. Bead 240 may have a congruent shape and size as body exterior seal periphery 260 and when force 250 is applied to pressure ring 20, bead 240 may press backing cushion 55 against diaphragm 50 and diaphragm 50 against body exterior seal periphery 260. Bead 260 pressing backing cushion 55 against diaphragm 50 and diaphragm 50 against body exterior seal periphery 260 may seal diaphragm to body exterior seal periphery 260.

In another embodiment, body exterior seal periphery 260 may include a raised bead. Diaphragm 50 may be in contact with bead of body exterior seal periphery 260. Bead 240 may have a congruent shape and size as bead of body exterior seal periphery 260 and when force 250 is applied to pressure ring 20, bead 240 may press backing cushion 55 against diaphragm 50 and diaphragm 50 against bead of body exterior seal periphery 260. Bead 260 pressing backing cushion 55 against diaphragm 50 and diaphragm 50 against bead of body exterior seal periphery 260 may seal diaphragm to bead of body exterior seal periphery 260.

A device in accordance with the present disclosure may facilitate a transition between circular sections of a bonnet assembly to a non-circular body exterior seal periphery of a body assembly. A device in accordance with the present disclosure may provide a pressure seal of the diaphragm assembly against the body assembly. A device in accordance with the present disclosure may provide a pressure ring with an intermediary shape, effective to provide a peripheral seal around a non-circular weir. A device in accordance with the present disclosure may allow a bonnet inside diameter to remain circular, resulting in less expense and easier seal with a simple O-ring.

FIG. 4 illustrates a flow diagram for an example process to seal a diaphragm to a body exterior seal periphery of a body assembly, arranged in accordance with at least some embodiments presented herein. An example process may include one or more operations, actions, or functions as illustrated by one or more of blocks S2, S4, and/or S6. Although illustrated as discrete blocks, various blocks may be divided into additional blocks, combined into fewer blocks, or eliminated, depending on the desired implementation.

Processing may begin at block S2, "Attach a diaphragm assembly to a bonnet assembly". At block S2, a diaphragm assembly may be attached to a bonnet assembly. The diaphragm assembly may include a diaphragm and a backing cushion, Processing may continue from block S2 to block S4, "Attach the bonnet assembly with the attached diaphragm assembly to the body assembly". At block S4, the bonnet assembly with the attached diaphragm assembly may be attached to the body assembly. The body assembly may define a fluid passageway and may include a weir positioned within the fluid passageway. The weir may cooperate with the diaphragm assembly to control a flow of fluid through the fluid passageway.

Processing may continue from block S4 to block S6, "Rotate a handwheel of the bonnet assembly, wherein the rotation of the handwheel moves a load plate within a column defined by a bonnet housing of the bonnet assembly to compress a spring washer within the column, the compressed spring washer applies a compression force to a top portion of a transition pressure ring within the column, and the top portion of the transition pressure ring has a circular cross section, wherein a bottom portion of the transition pressure ring includes a bead on a bottom surface of the bottom portion, the bead projects out from the bottom surface of the bottom portion, the bead has a congruent shape and size as the body exterior seal periphery of the body assembly, the body exterior seal periphery of the body assembly is not congruent to the circular cross section of the top portion, and the compression force applied to the top portion of the transition pressure ring, presses the bead against the diaphragm assembly and the diaphragm against the body exterior seal periphery, to seal the diaphragm to the body exterior seal periphery". At block S6, a handwheel of the bonnet assembly may be rotated. The rotation of the handwheel may move a load plate within a column defined by a bonnet housing of the bonnet assembly to compress a spring washer within the column. The compressed spring washer may apply a compression force to a top portion of a transition pressure ring within the column. The top portion of the transition pressure ring may have a circular cross section. A bottom portion of the transition pressure ring may include a bead on a bottom surface of the bottom portion. The bead may project out from the bottom surface of the bottom portion. The bead may have a congruent shape and size as the body exterior seal periphery of the body assembly. The body exterior seal periphery of the body assembly may not be congruent to the circular cross section of the top portion. The compression force applied to the top portion of the transition pressure ring may press the bead against the diaphragm assembly and the diaphragm against the body exterior seal periphery to seal the diaphragm to the body exterior seal periphery.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A bonnet assembly, the bonnet assembly comprising:
   a handwheel;
   a bonnet housing, wherein the bonnet housing defines a cylindrical column;
   a load plate within the cylindrical column;
   a spring washer within the cylindrical column, wherein a first side of the spring washer is in contact with the load plate; and
   a transition pressure ring, wherein the transition pressure ring includes a top portion and a bottom portion, the top portion has a circular cross section with a diameter and is in contact with a second side of the spring washer, the bottom portion has a non-circular cross section with a width, and the width of the bottom portion is greater than the diameter of the top portion, the bottom portion further includes a bead on a bottom surface of the bottom portion, the bead projects out from the bottom surface of the bottom portion, the bead has a congruent shape and size as a body exterior seal periphery of a body assembly, and the body exterior seal periphery of the body assembly is not congruent to the circular cross section of the top portion.

2. The bonnet assembly of claim 1, wherein the bonnet housing defines an opening and the bottom portion of the transition pressure ring fits within the opening defined by the bonnet housing.

3. The bonnet assembly of claim 1, wherein the transition pressure ring comprises stainless steel.

4. The bonnet assembly of claim 1, wherein the top portion of the transition pressure ring includes an O-ring and the O-ring is configured to form a seal between an outer edge of the top portion of the transition pressure ring and walls of the bonnet housing that define the cylindrical column.

5. The bonnet assembly of claim 1, wherein a shape of the body exterior seal periphery of the body assembly is oval or racetrack and the shape of the bead is oval, racetrack, or circular.

6. The bonnet assembly of claim 1, wherein the bead projects from the bottom surface of the bottom portion at a height of 0.020 to 0.050 inches from the bottom surface of the bottom portion.

7. The bonnet assembly of claim 1, wherein the bead has a width of 0.06 to 0.120 inches.

8. A method to seal a diaphragm to a body exterior seal periphery of a body assembly, the method comprising:
   attaching a diaphragm assembly to a bonnet assembly;
   attaching the bonnet assembly with the attached diaphragm assembly to the body assembly;
   rotating a handwheel of the bonnet assembly, wherein the rotation of the handwheel compresses a spring washer within a column, the compressed spring washer applies a compression force to a top portion of a transition pressure ring within the column, and the top portion of the transition pressure ring has a circular cross section with a diameter; and
   wherein a bottom portion of the transition pressure ring has a non-circular cross section with a width, and the width of the bottom portion is greater than the diameter of the top portion, the bottom portion further includes a bead on a bottom surface of the bottom portion, the bead projects out from the bottom surface of the bottom portion, the bead has a congruent shape and size as the body exterior seal periphery of the body assembly, the body exterior seal periphery of the body assembly is not congruent to the circular cross section of the top portion, and the compression force applied to the top portion of the transition pressure ring, presses the bead against the diaphragm assembly and the diaphragm against the body exterior seal periphery, to seal the diaphragm to the body exterior seal periphery.

9. The method of claim 8, wherein a shape of the body exterior seal periphery of the body assembly is oval or racetrack and the shape of the bead is oval, racetrack, or circular.

10. A valve, the valve comprising:
    a bonnet assembly, wherein the bonnet assembly includes:
      a handwheel;
      a bonnet housing, wherein the bonnet housing defines a cylindrical column;
      a load plate within the cylindrical column;
      a spring washer within the cylindrical column, wherein a first side of the spring washer is in contact with the load plate; and
      a transition pressure ring;
    a diaphragm assembly; and
    a body assembly, wherein the body assembly includes a weir;
    wherein the transition pressure ring includes a top portion and a bottom portion, the top portion has a circular cross section with a diameter and is in contact with a second side of the spring washer, the bottom portion has a non-circular cross section with a width, and the width of the bottom portion is greater than the diameter of the top portion, the bottom portion further includes a bead on a bottom surface of the bottom portion, the bead projects out from the bottom surface of the bottom portion, the bead has a congruent shape and size as a body exterior seal periphery of the body assembly, and the body exterior seal periphery of the body assembly is not congruent to the circular cross section of the top portion.

11. The valve of claim 10, wherein the transition pressure ring comprises stainless steel.

12. The valve of claim 10, wherein a shape of the body exterior seal periphery of the body assembly is oval or racetrack and the shape of the bead is oval, racetrack, or circular.

13. The valve of claim 10, wherein the bead projects from the bottom surface of the bottom portion at a height of 0.020 to 0.050 inches from the bottom surface of the bottom portion.

14. The valve of claim 10, wherein the bead has a width of 0.06 to 0.120 inches.

* * * * *